(12) United States Patent
Bassett et al.

(10) Patent No.: US 9,693,505 B2
(45) Date of Patent: Jul. 4, 2017

(54) MERGER AND PICK-UP HEADER FOR A MERGER HAVING AN ADJUSTABLE SKID SHOE

(71) Applicant: KUHN NORTH AMERICA, INC., Brodhead, WI (US)

(72) Inventors: William Bassett, Brodhead, WI (US); Damion Babler, Brodhead, WI (US); Dennis Williams, Brodhead, WI (US); Shane Williams, Brodhead, WI (US)

(73) Assignee: KUHN NORTH AMERICA, INC., Brodhead, WI (US)

(*) Notice: Subject to any disclaimer, the term of this patent is extended or adjusted under 35 U.S.C. 154(b) by 0 days.

(21) Appl. No.: 15/365,570

(22) Filed: Nov. 30, 2016

(65) Prior Publication Data

US 2017/0079211 A1    Mar. 23, 2017

Related U.S. Application Data

(63) Continuation of application No. 14/798,184, filed on Jul. 13, 2015, now Pat. No. 9,538,709.

(60) Provisional application No. 62/037,992, filed on Aug. 15, 2014.

(51) Int. Cl.
| | | |
|---|---|---|
| A01D 43/00 | (2006.01) | |
| A01D 57/00 | (2006.01) | |
| A01D 89/00 | (2006.01) | |
| A01D 57/20 | (2006.01) | |
| A01D 87/04 | (2006.01) | |
| A01D 84/00 | (2006.01) | |

(52) U.S. Cl.
CPC ........... *A01D 89/004* (2013.01); *A01D 57/20* (2013.01); *A01D 84/00* (2013.01); *A01D 87/04* (2013.01); *A01D 89/002* (2013.01); *A01D 89/003* (2013.01)

(58) Field of Classification Search
CPC ........ A01D 57/20; A01D 84/00; A01D 41/14; A01D 57/28; A01D 61/002; A01D 89/001
See application file for complete search history.

(56) References Cited

U.S. PATENT DOCUMENTS

| | | |
|---|---|---|
| 2,971,316 A | 2/1961 | Wsewolod |
| 3,163,974 A | 1/1965 | Mack |
| 3,611,681 A | 10/1971 | Blanton et al. |
| 3,886,718 A | 6/1975 | Talbot |
| 3,925,971 A | 12/1975 | Goering |
| 4,438,619 A | 3/1984 | Heim |
| 4,441,307 A | 4/1984 | Enzmann |
| 4,464,890 A | 8/1984 | Scholtissek |
| 4,573,308 A | 3/1986 | Ehrecke |
| 4,665,685 A | 5/1987 | Rupprecht |
| 4,926,625 A | 5/1990 | Laquerre |

(Continued)

*Primary Examiner* — Árpád Fábián-Kovács
(74) *Attorney, Agent, or Firm* — Oblon, McClelland, Maier & Neustadt, L.L.P.

(57) ABSTRACT

A merger apparatus including a pick-up header; a conveyor with a conveyor belt; a skid shoe disposed below the pick-up header and the conveyor; and an operative connection between the pick-up header and the skid shoe that enables the merger apparatus to articulate independently of an external frame underneath the conveyor, such that loose material transported by the conveyor belt that lags beneath the return side may fall to the ground keeping the return side of the conveyor belt free from obstructions.

6 Claims, 18 Drawing Sheets

(56) References Cited

U.S. PATENT DOCUMENTS

| | | |
|---|---|---|
| 4,942,724 A | 7/1990 | Diekhans |
| 5,090,184 A | 2/1992 | Garter |
| 5,203,154 A | 4/1993 | Lesher |
| D391,582 S | 3/1998 | Bruns |
| 6,289,659 B1 | 9/2001 | Fox |
| 6,588,187 B2 | 7/2003 | Engelstad |
| 6,883,299 B1 | 4/2005 | Gramm |
| 7,222,474 B2 * | 5/2007 | Rayfield ............... A01D 41/141 56/10.2 E |
| 7,730,700 B2 * | 6/2010 | Nathan ................ A01D 41/141 56/10.2 E |
| 7,975,458 B1 | 7/2011 | Noll |
| 8,091,331 B2 | 1/2012 | Dow |
| 8,146,335 B2 | 4/2012 | Vandeven |
| 8,201,388 B1 | 6/2012 | Vandeven |
| 8,205,421 B2 * | 6/2012 | Sauerwein ............. A01D 41/14 56/181 |
| 8,726,621 B2 | 5/2014 | Ritter |
| 8,863,486 B2 | 10/2014 | Landon |
| 8,863,489 B2 * | 10/2014 | Landon ................ A01D 57/28 56/192 |
| 8,919,088 B2 | 12/2014 | Dow |
| 9,095,093 B2 | 8/2015 | Hyronimus |
| 2004/0200203 A1 * | 10/2004 | Dow ...................... A01B 73/02 56/375 |
| 2006/0242935 A1 | 11/2006 | Rayfield |
| 2009/0084080 A1 * | 4/2009 | Coers ................... A01D 61/002 56/15.8 |
| 2009/0241503 A1 * | 10/2009 | Babler .................. A01D 84/00 56/366 |
| 2010/0037584 A1 | 2/2010 | Dow |
| 2010/0043375 A1 | 2/2010 | Schmidt |
| 2010/0077712 A1 | 4/2010 | Nathan |
| 2010/0095646 A1 * | 4/2010 | Schmidt ................ A01D 41/14 56/14.3 |
| 2012/0247078 A1 | 10/2012 | Landon |
| 2013/0014481 A1 | 1/2013 | Dow |
| 2014/0260168 A1 | 9/2014 | Clark et al. |
| 2015/0128552 A1 * | 5/2015 | Dow ...................... A01B 73/02 56/377 |
| 2015/0282426 A1 * | 10/2015 | Gantzer ................. A01D 57/28 56/376 |
| 2016/0309655 A1 * | 10/2016 | Treffer ............... A01D 87/0092 |
| 2016/0360703 A1 * | 12/2016 | Leiston ................ A01D 78/001 |

\* cited by examiner

MERGER AND PICK-UP HEADER FOR A MERGER HAVING AN ADJUSTABLE SKID SHOE

CROSS REFERENCE TO RELATED APPLICATIONS

This application is a continuation of U.S. application Ser. No. 14/798,184 filed Jul. 13, 2015, which claims the benefit of priority from U.S. Provisional Application No. 62/037,992 filed Aug. 15, 2014, the entire contents of each of which are herein incorporated by reference.

BACKGROUND OF THE DISCLOSURE

Field of the Disclosure

The present disclosure relates to windrow merger assembly including a pick-up header for lifting material from the ground. In agricultural applications, the pick-up header may be utilized on the merger to lift material, such as crops, from a field and then transfer the material to a belt-type conveyor. The conveyor may then shift the material laterally to form a windrow that can later be picked up.

Description of the Related Art

In related art, a machine including a pick-up header may have skid shoes disposed beneath the pick-up header to maintain a minimum clearance between the ground and the pick-up header. A machine 300 related to the present disclosure is illustrated in FIGS. 7A-E, and includes a pick-up header 301 with an external frame 303. Skid shoes 305 are mounted to the external frame 303 at attachment points 307. The skid shoes 305 may be adjustable to allow for changing field and/or crop conditions. In particular, the skid shoes 305 may be adjusted to allow the pick-up header 301 to be very close to the ground to maximize crop capture. The skid shoes 305 may also be adjusted to increase the distance between the pick-up header 301 and the ground in order to clear obstacles, such as rocks, or leave an undesirable portion of the crop.

The skid shoes 305 must be mounted to the external frame 303 of the pick-up header 301 in some manner. In the typical configuration of the related art, the external frame 303 is positioned beneath a belt 309 along with the attachment points 307 that the skid shoes 305 mount to. As a result, the external frame 303 creates catch points in areas 310 above the external frame 303 that can trap material falling from the belt 309. Trapped material can slow or stop the rotation of the belt 309 and create uneven crop distribution reducing efficiency and feed quality. If enough material builds up, it can eventually lead to damage of the machine 300 and/or field. The external frame 303 also takes up room beneath the machine 300, reducing ground clearance and increasing the risk of contact with the terrain.

SUMMARY OF THE DISCLOSURE

In one aspect of the disclosure, a merger apparatus is provided which includes a pick-up header, a conveyor with a conveyor belt, and a skid shoe disposed below the pick-up header and the conveyor. The merger apparatus may include an operative connection between the pick-up header and the skid shoe that enables the merger apparatus to be free of an external frame underneath the conveyor.

In another aspect of the disclosure, a merger apparatus for lifting and conveying material is provided. The merger apparatus may include a pick-up header, a horizontal frame member, and a conveyor positioned between the pick-up header and the horizontal frame member in a front to rear direction of the merger apparatus. A plurality of skid shoes positioned below at least one of the pick-up headers and the conveyor may be provided along with a main pivot shaft operatively connected to at least one of the pick-up headers and the horizontal frame member. In one aspect of the disclosure, a first space may be provided between the conveyor and the skid shoes in a vertical direction, and a second space may be provided between the conveyor and a surface that the skid shoes rest on to support the merger apparatus. The skid shoes may be mounted on the main pivot shaft and at least one of an angle of the skid shoes and a vertical position of the pick-up header may be adjusted with a rotational movement of the main pivot shaft. In one aspect of the disclosure, material remaining on a conveyor surface that faces the surface may fall directly through the first space and the second space without being obstructed.

In another aspect of the disclosure, a pick-up header is provided to include a plurality of pick-up teeth, a header frame, a lower rear frame member extending from the header frame in a front to rear direction of the pick-up header on an opposite side of the header frame as the pick-up teeth. A plurality of support plates may be mounted to the lower rear frame member, and the main pivot shaft may be positioned on the side of the pick-up frame with the lower rear frame member. In one aspect of the disclosure, a plurality of bearings may be attached to the support plates and rotatably support the main pivot shaft. At least one skid shoe may be mounted to each shaft end of the main pivot shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
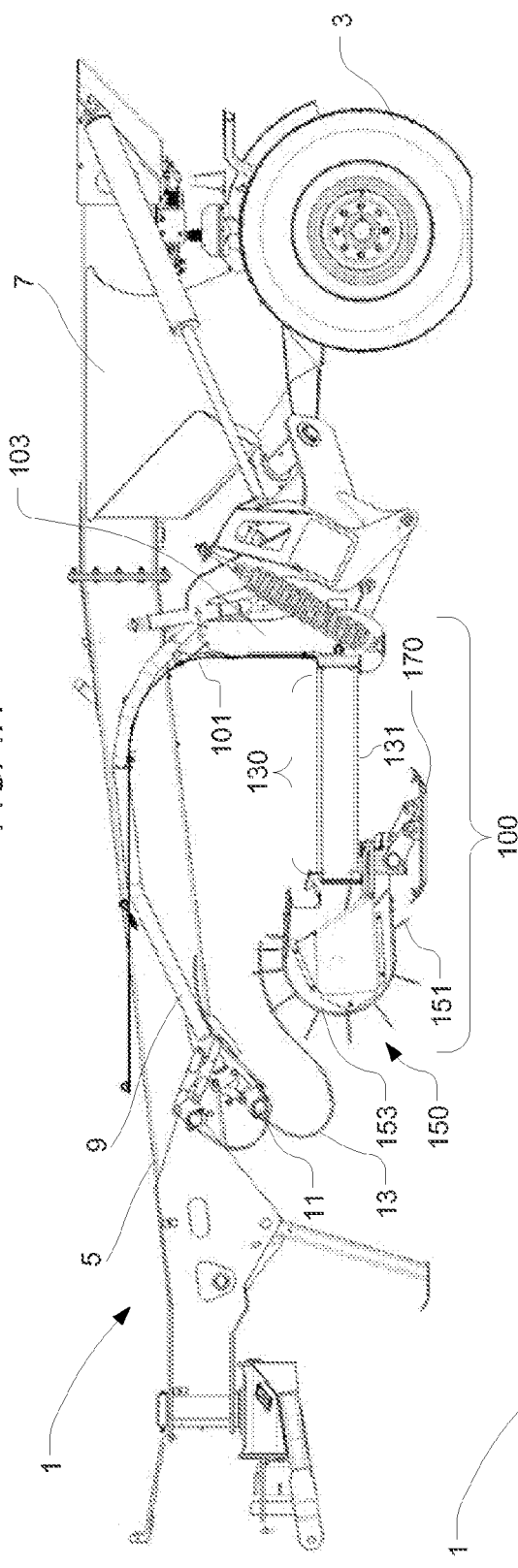
FIGS. 1A-1C illustrate an exemplary embodiment of a windrow merger assembly including several mergers according to the present disclosure.

Referring now to the drawings, wherein like reference numerals designate identical or corresponding parts throughout the several views. It is noted that as used in the specification and the appending claims the singular forms "a," "an," and "the" can include plural references unless the context clearly dictates otherwise.

The following description relates to a pick-up header and a merger including the pick-up header, and a conveyor, which are supported by skid shoes that rest on the ground. The skid shoes may be attached to a frame member of the pick-up header and/or a main pivot shaft which may be connected to a system of linkages. In exemplary embodiments including the main pivot shaft and the system of linkages, an elevation of the pick-up header and an orientation of the skid shoes may be adjusted with an operation of the system of linkages. The system of linkages may be positioned within components of a pick-up header frame, a conveyor frame, and a merger frame.

During operation, material that is picked up by the pick-up header and conveyed in a longitudinal direction of the merger may remain on a conveyor belt on a return side of the conveyor. With the skid shoes attached to the frame of the pick-up header and/or the main pivot shaft, an arrangement of the skid shoes, with or without the main pivot shaft and the system of linkages, may not require an external frame to be provided beneath the conveyor in exemplary embodiments of a merger according to the present disclosure. As a result, material that lags on the return side of the conveyor may fall to the ground keeping the return side of the conveyor belt free from obstructions.

Windrow Merger Assembly

Figure 1B:
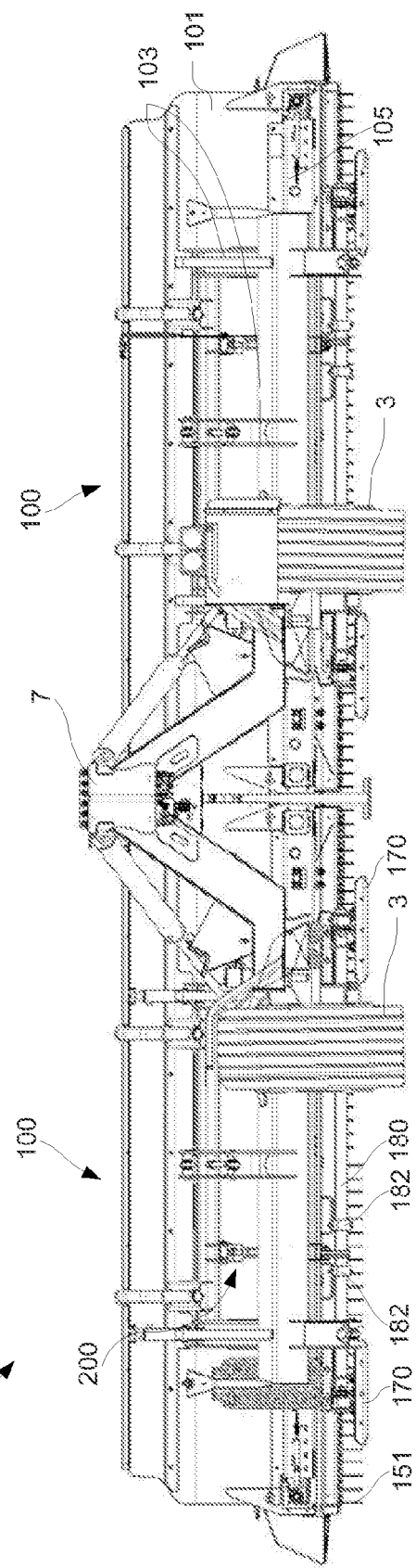
Figure 1C:
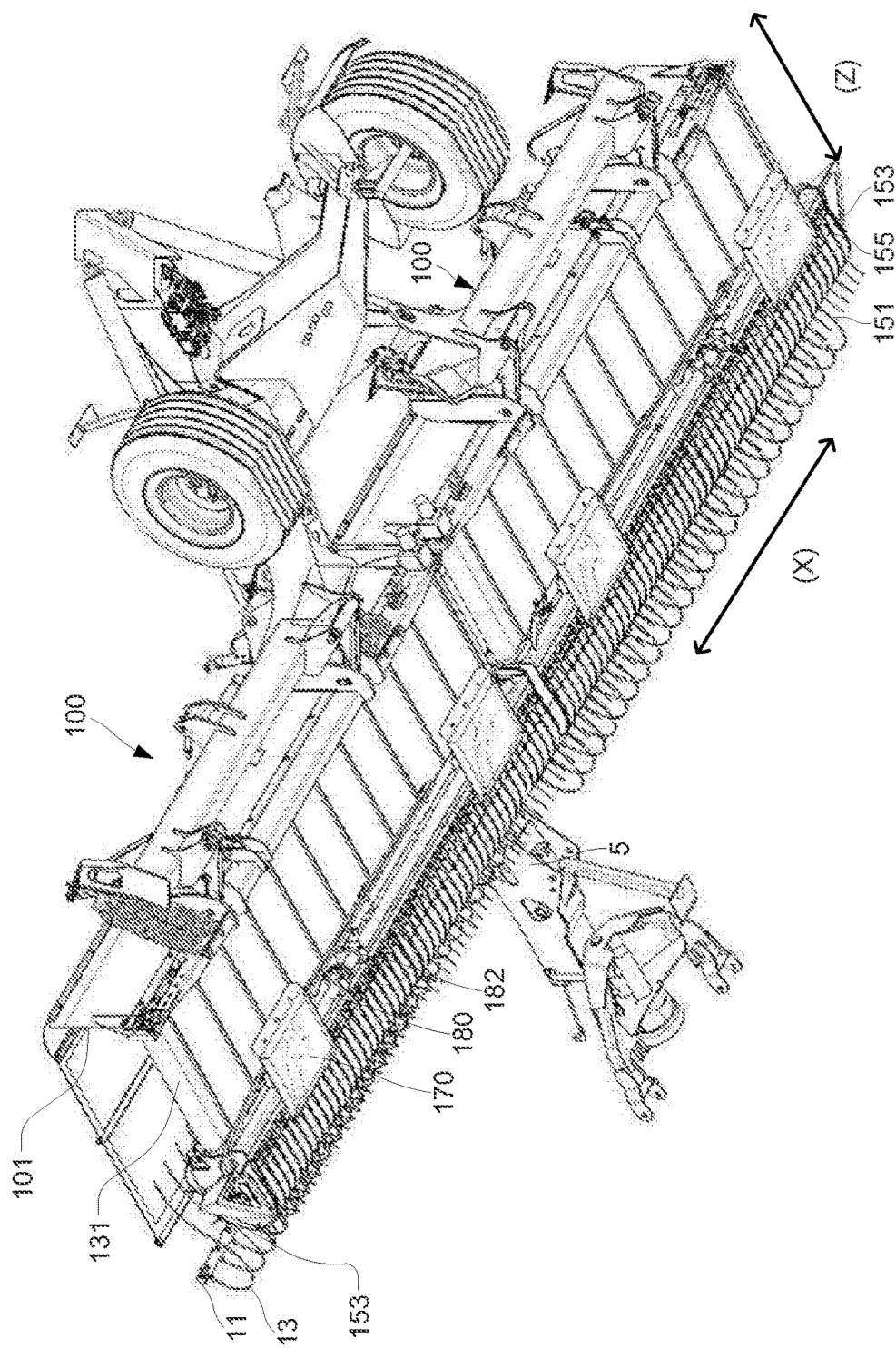

FIGS. 1A-C illustrate an exemplary embodiment of a windrow merger assembly 1 according to the present disclosure that is supported by wheels 3 on the ground and may be towed by a vehicle (not shown) via a tongue 5 extending from a trailer 7. As illustrated in FIG. 1B, the windrow merger assembly 1 includes mergers 100 operably connected to the trailer 7 that is supported by the wheels 3. Arms 9 extend from behind a deflector 101 mounted to vertical frame members 103 of each merger 100. The arms 9 extend over a conveyor 130 of each merger 100 and attach to a bar 11, from which guides 13 extend. The guides 13 extend from the bar 11 over a plurality of pick-up teeth 151 between end plates 153 of a pick-up header 150 according to the present disclosure. The pick-up teeth 151 are positioned to alternate with pick-up guards 155 on a front of the pick-up header 150 along a longitudinal direction (X axis) of the merger 100 (FIG. 1C). At least one of the end plates 153 may support a drive shaft (not shown) which transfers rotational force to drive the plurality of pick-up teeth 151. Skid shoes 170 are provided under each merger 100. During operation, the skid shoe 170 may contact the ground to maintain a minimum clearance (S) between the ground and the pick-up header 150 as illustrated in FIG. 2A.

Merger

Figure 2A:
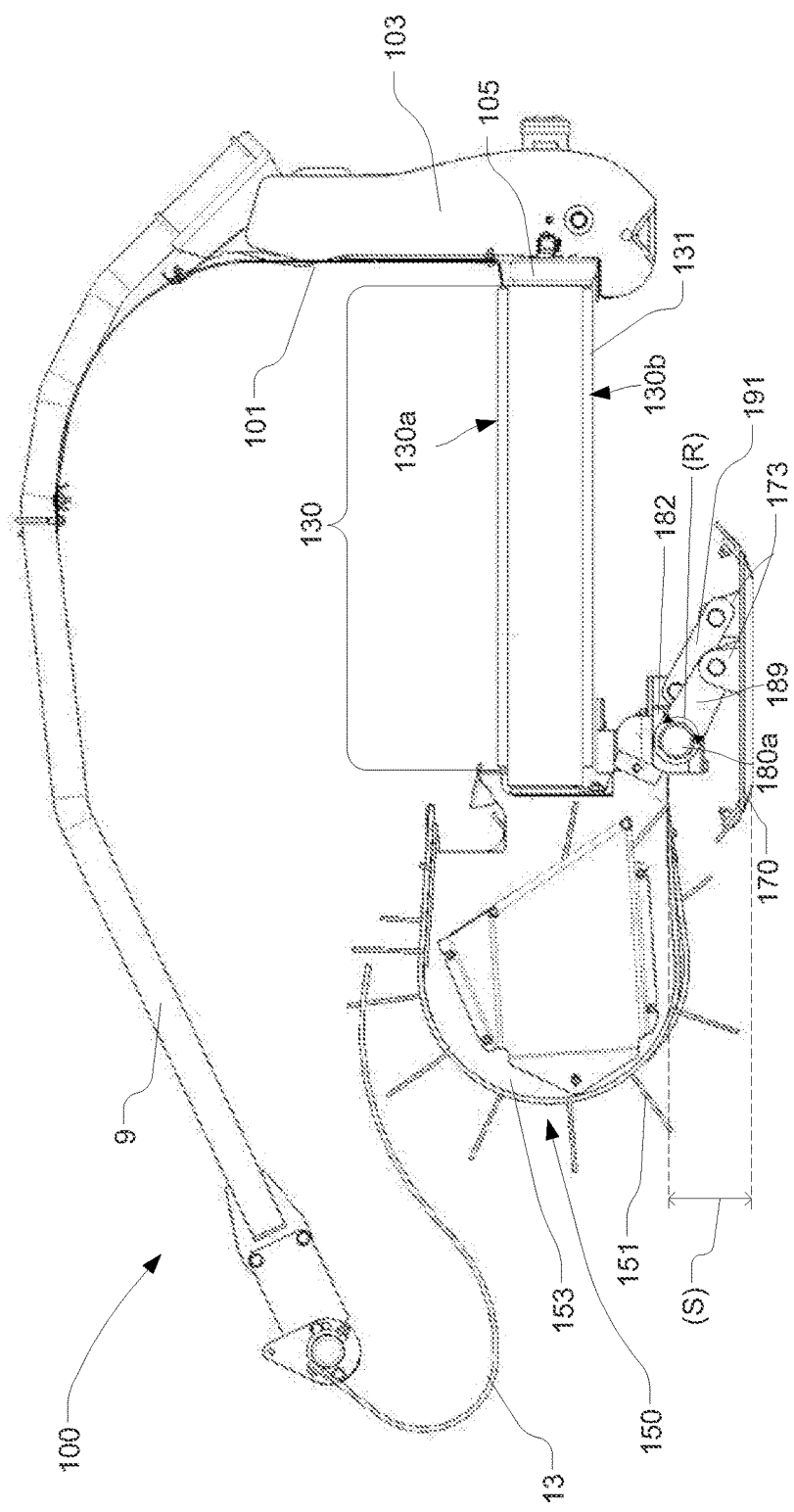
FIGS. 2A-2C illustrate an exemplary embodiment of a merger according to the present disclosure.
Figure 2B:
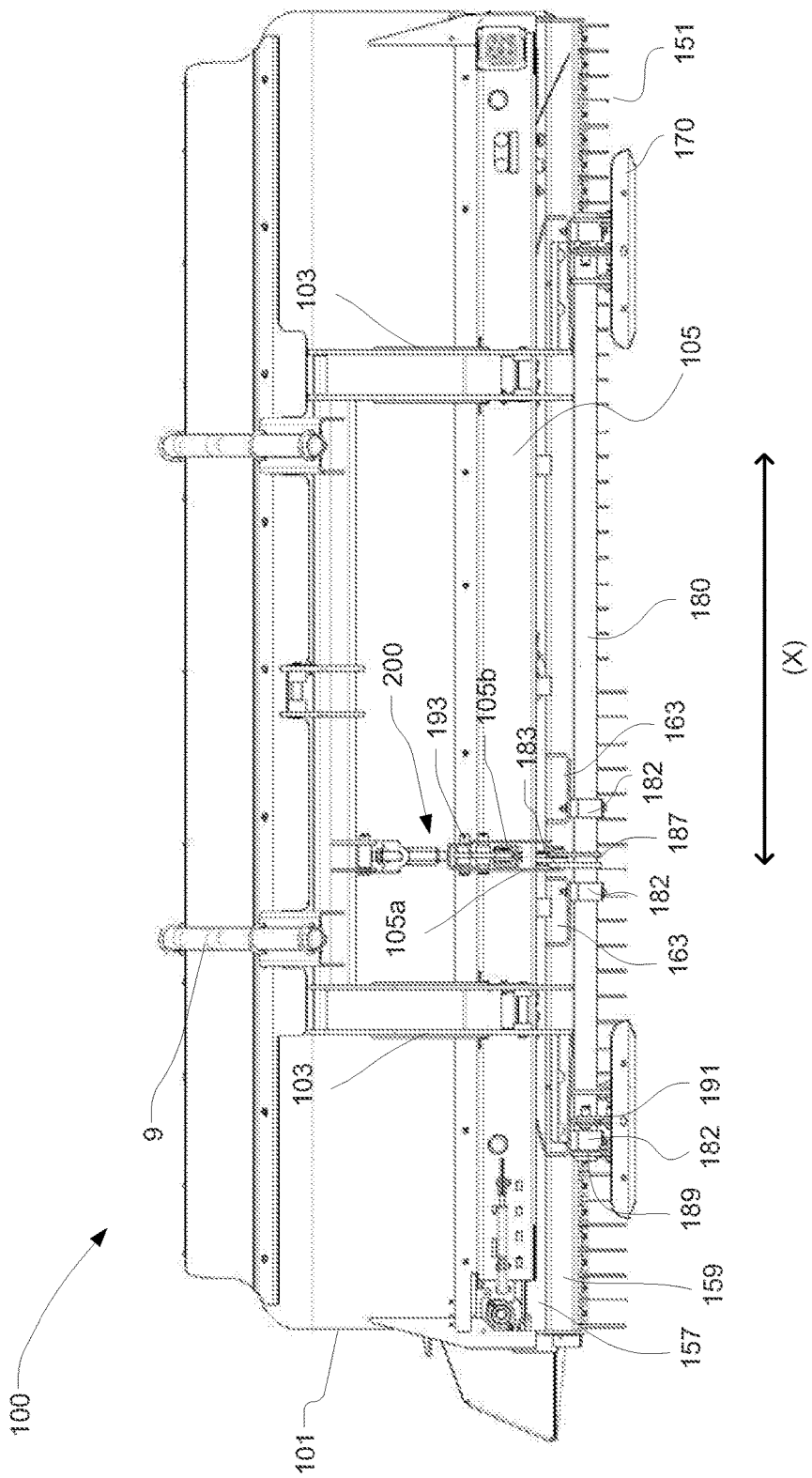
Figure 2C:
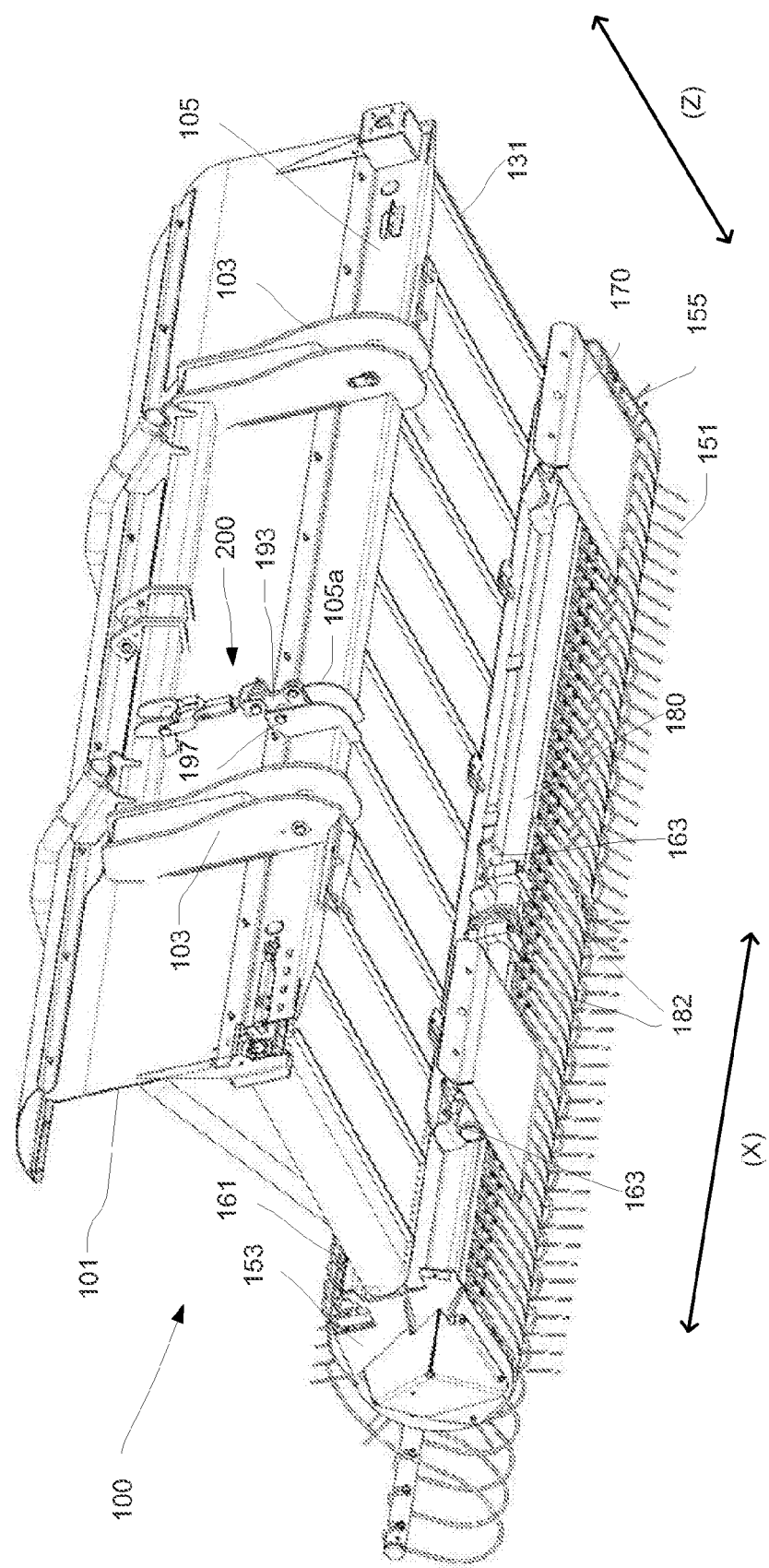

FIGS. 2A-2C illustrate the merger 100 including the pick-up header 150 according to the present disclosure in more detail. As illustrated in FIG. 2A, a deflector 101 is mounted on the vertical frame members 103 of the merger 100. The vertical frame members 103 are attached to a horizontal frame member 105 as illustrated in FIGS. 2A and 2B, which extends in the longitudinal direction (X axis) of the merger 100. The conveyor 130 is positioned between the horizontal frame member 105 of the merger 100 and the pick-up header 150.

As illustrated in FIGS. 2A and 2C, the conveyor 130 includes a conveyor belt 131 that is driven to rotate around the merger 100 to convey material on a top side 130a in the longitudinal direction (X axis) of the merger 100. The conveyor belt 131 may be an endless conveyor belt driven by rollers and supported by a frame as described in more detail below.

Because a frame is not provided under a return side 130b of the conveyor 130, lagging material does not fall and accumulate on a structural element immediately below the conveyor belt 131. Thus, an issue of material accumulating and forming catch points that may slow or stop the conveyor 130 may be avoided with the merger 100 of the present disclosure.

Pick-up Header

Figure 3:
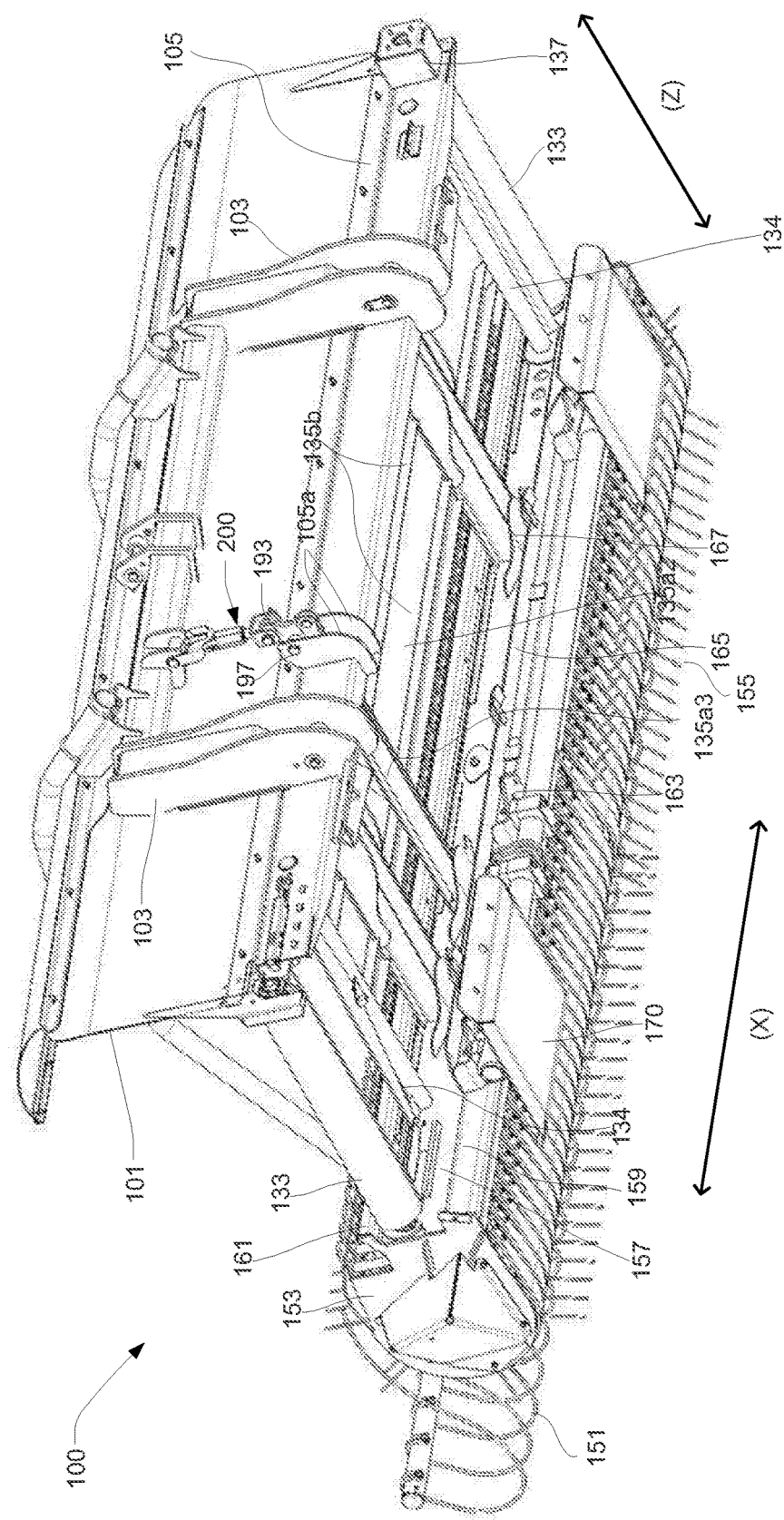
FIG. 3 illustrates a perspective view from behind an exemplary embodiment of a merger according to the present disclosure without a conveyor belt.
Figure 4:
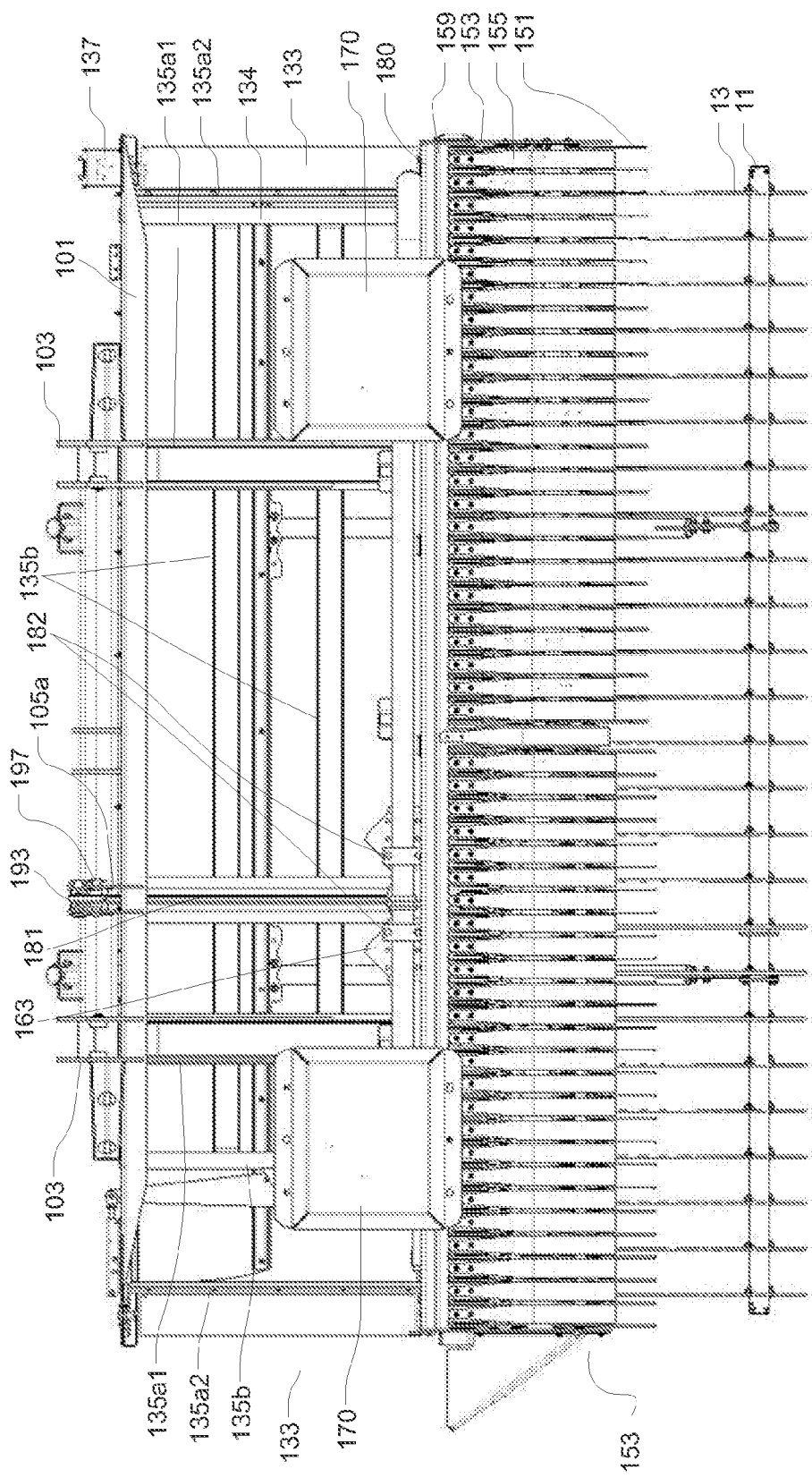
FIG. 4 illustrates a bottom view of an exemplary embodiment of a merger according to the present disclosure without a conveyor belt.

FIGS. 3 and 4 illustrate various aspects of the pick-up header 150 according to the present disclosure. The pick-up header 150 includes a header frame 157. One side of the header frame is attached to the pick-up teeth 151 and the pick-up guards 155, and an opposite side is attached to the conveyor 130, which extends in the longitudinal direction (X axis) of the merger 100 between the endplates 153 (FIG. 4). The conveyor 130 is attached to the header frame 157 just above a lower rear frame member 159 and below an upper rear frame member 161. The lower rear frame member 159 and the upper rear frame member 161 extend in the longitudinal direction (X axis), while projecting from the pick-up header 150 in a front to rear direction (Z axis) of the merger 100 (FIG. 1C).

FIG. 3 further illustrates support plates 163 positioned under a longitudinal guide 165 mounted onto the lower rear frame member 159 of the header frame 157. The support plates 163 help support the main pivot shaft 180.

Individual guide members 167 are attached to the header frame 157 below attachment points for cross members (135a1, 135a3) of the conveyor 130 described in more detail below. The conveyor belt 131 (see FIGS. 2A and 2C) may fit in a space defined between the longitudinal guide plate 165 and the individual guide members 167, such that a movement of the conveyor belt 131 is guided by the guide members 167 in the longitudinal direction (X axis). The guide members 167 also prevent an inner side of the conveyor belt 131 from contacting lower sides of the cross members (135a1, 135a3, and 134), which could impede the movement of the conveyor belt 131.

Conveyor

FIGS. 3-5A describe the present disclosure having an internal structure of the merger 100 including an internal structure of the conveyor 130.

FIG. 3 illustrates a perspective view from a back of the merger 100 similar to FIG. 2C, and FIG. 4 illustrates a bottom view of the merger 100 according to the present disclosure. In FIGS. 3 and 4, the conveyor belt 131 is removed in order to show primary rollers 133 and a conveyor frame (134, 135a1, 135a2, 135b) of the conveyor 130.

Primary rollers 133 are positioned on opposite ends of the merger 100 in the longitudinal direction (X axis). A drive mount 137 is connected on to a rear of the horizontal frame member 105 in a location corresponding to one of the primary rollers 133. The drive mount 137 connects to the primary roller 133 in order to rotate the primary roller 133 and drive the conveyor belt 131 (see FIGS. 2A and 2C).

Figure 5A:
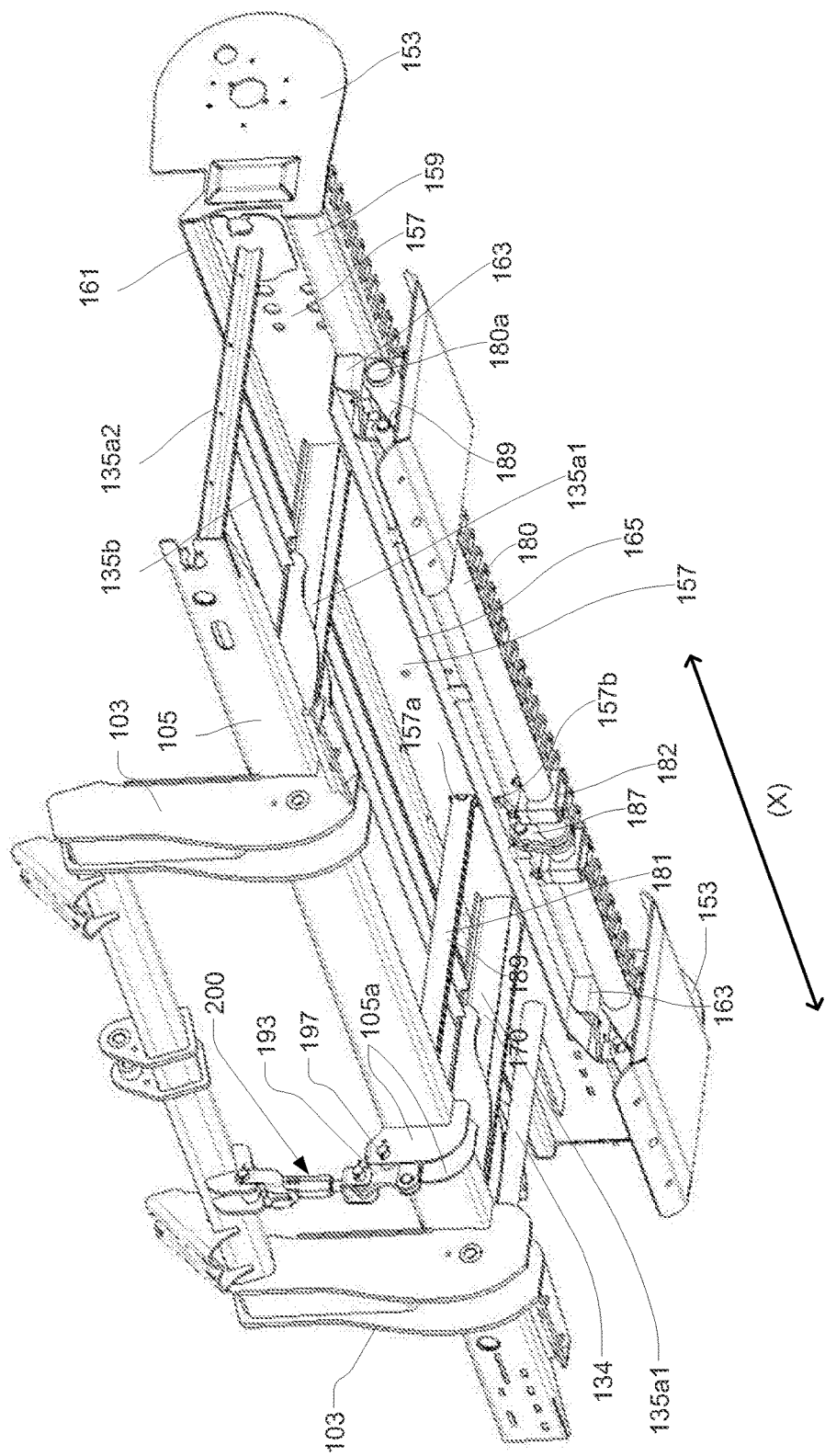
FIG. 5A-5B illustrate exemplary parts of an internal structure of an exemplary embodiment of a merger according to the present disclosure.

As illustrated in FIG. 5A, the conveyor frame (134, 135a1, 135a3, 135b) includes first cross members 135a1 and second cross members 134 extending in the front to rear direction (Z axis) and attached to the pick-up header frame 157 and the horizontal frame member 105. The first and second cross members (135a1, 134) support horizontal cross members 135b extending in the longitudinal direction (X axis). A surface belt rides on the horizontal cross member 135b, which also connects to the conveyor cross members 135*a*1, 135*a*3, and 134. The first and second cross members (135*a*1, 134) attach the deflector 101 (FIG. 2A-2C), vertical frame members 103, and horizontal frame member 105 to the pick-up header 150 (FIGS. 1 and 3) and support the overall structure of the merger 100 (FIG. 2A).

System of Linkages

A description of the arrangement of a system of linkages (180-200) and is provided with reference to FIGS. 2B, 5A, 5B, 6A, and 6B.

Figure 5B:
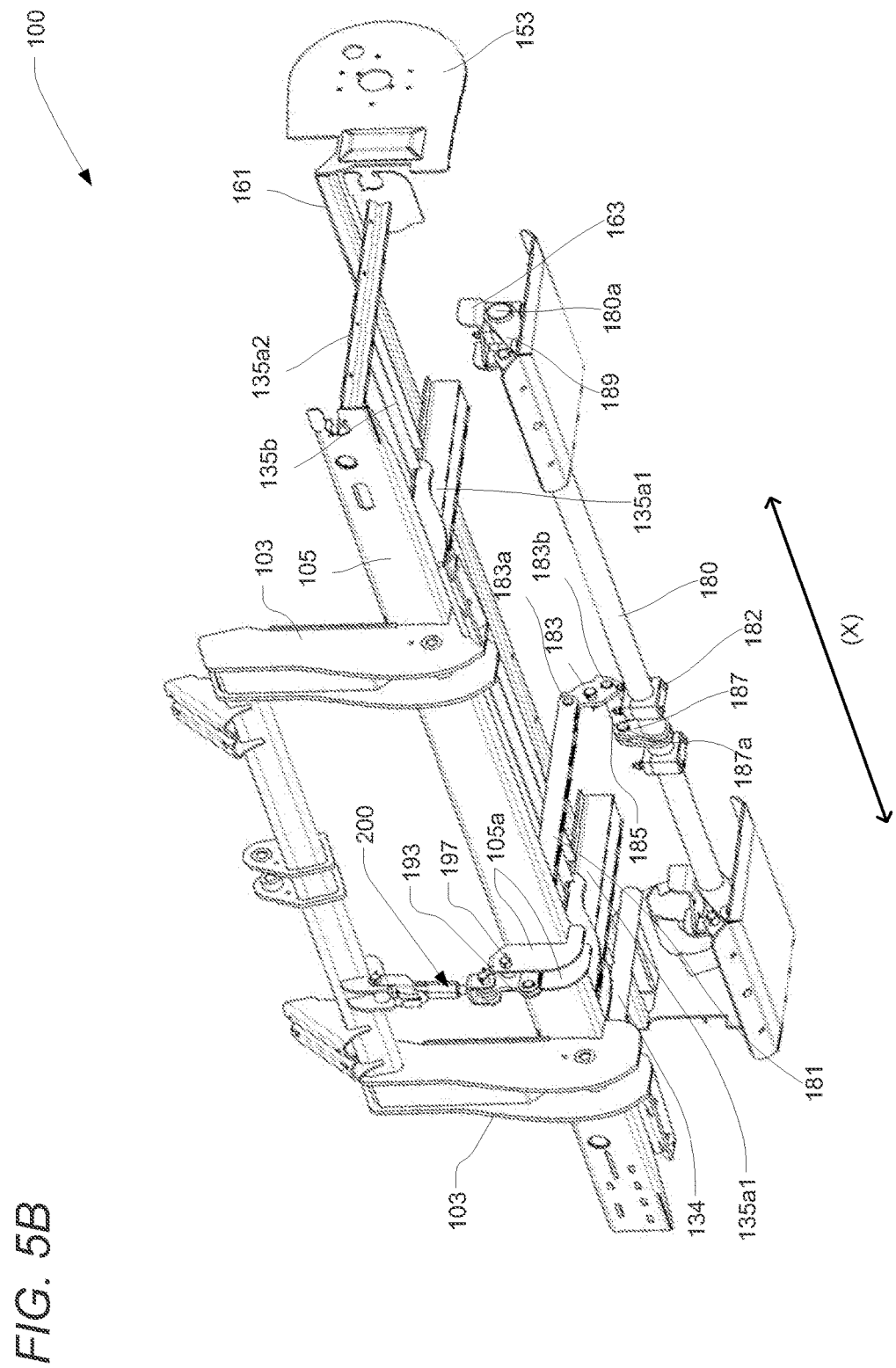

FIGS. 5A and 5B illustrate an embodiment of the system of linkages (180-200), including a main linkage 181 extending in the front to rear direction (Z axis), the main pivot shaft 180, and a linear actuator 200. FIG. 5A illustrates the merger 100 according to the present disclosure without the deflector 101 and the pick-up teeth 151, and shows the main pivot shaft 180 and the main linkage 181 of the system of linkages (180-200). The main pivot shaft 180 is attached to each skid shoe 170, and the main linkage 181 extends through the horizontal frame member 105 at one end, and the header frame 157 at an opposite end.

FIG. 5B illustrates the merger 100 according to the present disclosure without the deflector 101, the pick-up teeth 151, or portions of header frame 157 including the lower frame member 159. A first linkage arm 185 is also shown attached to the first pivot plate 183 by a linkage arm pin 183*b* (FIG. 5B). The first linkage arm 185 extends through a second opening 157*b* in the header frame 157 (FIG. 5A), to connect with a first connection member 187 by a first connection pin 187*a* (FIG. 5B). The first pivot plate 183 is connected to the first linkage arm 185 in order to translate the motion of the main linkage 181 to the main pivot shaft 180 via the first connection member 187.

A connection between the main linkage 181 and the main pivot shaft 180 is described with reference to FIGS. 5A, 5B, 6A, and 6B. The main linkage 181 extends within the conveyor unit 130 in the front to rear direction (Z axis). Specifically, the main linkage 181 is positioned between the first cross members 135*a*1 along the longitudinal direction (X axis), and attaches at one end to a first pivot plate 183. The main linkage 181 extends through a header frame opening 157*a* (FIG. 5A), to attach to the first pivot plate 183 positioned in front of the header frame 157 in the front to rear direction (Z axis) as shown in FIG. 5B. The main linkage 181 is attached to the first pivot plate 183 with a first main linkage pin 183*a*.

Figure 6A:
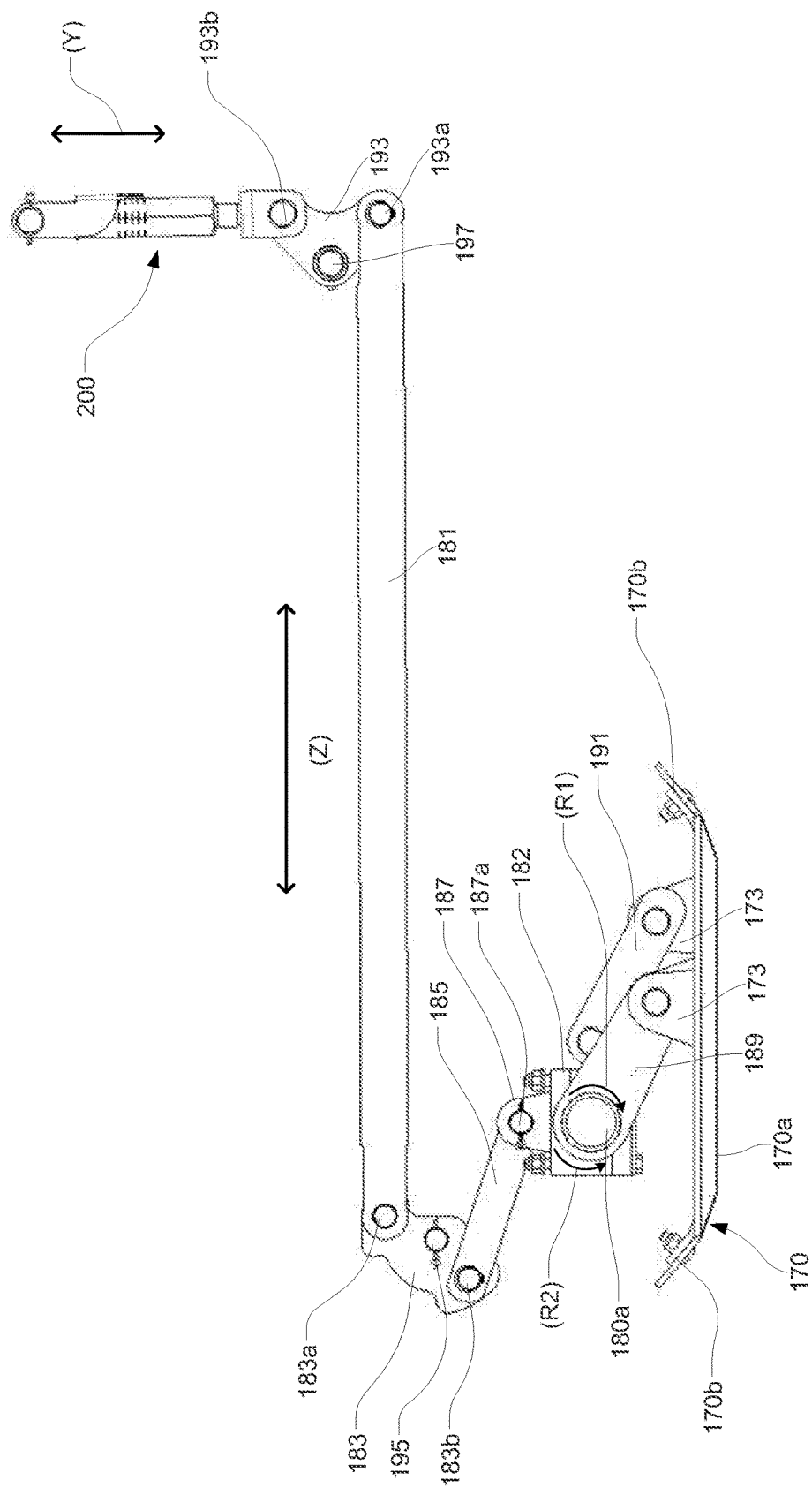
FIG. 6A-6C illustrate an exemplary system of linkages for an exemplary embodiment of a merger according to the present disclosure.
Figure 6B:
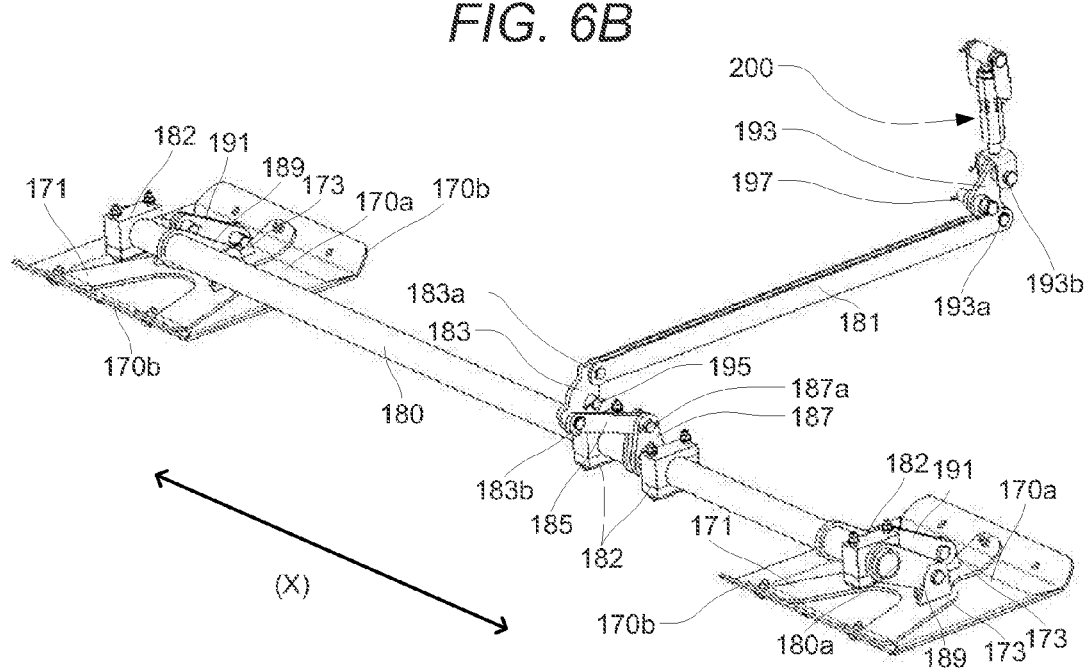

FIGS. 6A and 6B illustrate respective connections between the main linkage 181, first pivot plate 183, first linkage arm 185, and first connection member 187 by the first main linkage pin 183*a*, linkage arm pin 183*b*, and first connection pin 187*a*. As illustrated in FIGS. 5B, 6A, and 6B, the first linkage arm 185 may be connected to the main pivot shaft 180 by the first connection member 187. In other embodiments, the first linkage arm 185 may be directly connected to the main pivot shaft 180.

FIG. 6B is an exemplary embodiment according to the present disclosure, the main pivot shaft 180 may extend in the longitudinal direction (X axis) and be attached to second connection members 189 positioned at or near shaft ends 180*a* of the main pivot shaft 180.

In one embodiment, two connection members 189 may be connected symmetrically at one end to the main pivot shaft 180, and the other ends of the connection members 189 may be connected to pivot members 173 that are connected to the skid shoe 170. A second linkage arm 191 may be connected to another pivot member 173 at one end, and support plates 163 (FIGS. 5A, 5B) at the other end. The support plates 163 may also be connected to the 159 lower rear frame member and aid in the support of the longitudinal guide plate 165.

In addition, to the shaft ends 180*a*, the second connection members 189 may be positioned at intermediate positions on the main shaft 180 between the first connection member 187 and the shaft ends 180*a*. The second connection members 189 may attach the main pivot shaft to the skid shoes 170 by connecting to respective pivot members 173 described in detail below. In addition, a second linkage arm 191 may connect one of the support plates 163 (FIGS. 5A, 5B) to one of the pivot members 173 (FIGS. 6A-6C) of the skid shoe 170. The support plates 163 also aid in the support of the longitudinal guide plate 165 (FIGS. 3 and 5A). Bearings 182 may be provided to support the main pivot shaft 180 in rotation. The bearings 180 may be ball bearings, roller bearings, oil-film bearings, or any other type of appropriate bearing.

Further, the bearings 182 may be provided near the shaft ends 180*a* of the main pivot shaft 180 and in a vicinity of the first connection member 187 that is attached to the first linkage arm 185. In addition, the bearings 182 may be attached to support plates 163 (FIGS. 5A-5B) that may be positioned in locations corresponding to the shaft ends 180*a* of the main pivot shaft 180.

A connection between the main linkage 181 and the linear actuator 200 is described with reference to FIGS. 2B, 5A, 5B, 6A and 6B. An end of the main linkage 181 (FIG. 5B) passes through both a merger frame opening 105*b* (FIG. 2B), and a frame slot 105*a* (FIG. 5A-5B) mounted on the horizontal frame member 105.

With reference to FIGS. 5A and 5B, the linear actuator 200 may be provided at a rear of the conveyor 130. This location of the linear actuator 200 may provide easier access for manual adjustment of the skid shoe 170. The linear actuator 200 may be actuated manually or may be powered. The linear actuator 200 may be mechanical, hydraulic, electrical, or pneumatic. For example, the linear actuator 200 may include a ball screw, a solenoid, hydraulic cylinder, pneumatic cylinder, or a combination thereof. Further, the linear actuator 200 may be manually controlled or electronically controlled by a controller (not shown). The linear actuator 200 may move in a vertical direction (Y axis) which is identified in FIG. 6A, and may be connected to the main linkage 181. The actuator is a linear applicator or a pivot, or a rotary actuator.

As illustrated in FIGS. 6A and 6B, the system of linkages (180-200) includes a first pivot pin 195 extending through the first pivot plate 183, and a second pivot pin 197 extending through the second pivot plate 193. The first pivot pin 195 is provided to mount the first pivot plate 183 on to the pick-up header frame 157 (FIG. 5A) such that the first pivot plate 183 can rotate about an axis perpendicular to the front and rear direction (Z axis) and parallel to the longitudinal direction (X axis). The second pivot pin 197 is provided to mount the second pivot plate 193 on to the pick-up header frame 105*a* (FIG. 5A) such that the second pivot plate 193 can rotate about another axis perpendicular to the front and rear direction (Z axis) and parallel to the longitudinal direction (X axis). The actuator for this application could be any type of linear actuator or a pivot could be replaced with a rotary actuator.

The embodiment shown (FIG. 2C) is a manual screw type linear actuator. The housing is rotated causing the internal screw to either extend or retract.

FIGS. 6A and 6B illustrate the system of linkages (180-200) without the pick-up header frame 157 or the horizontal frame member 105 of the merger 100. The main linkage 181 is attached to a second pivot plate 193 by a second main linkage pin 193a. A linkage actuator pin 193b attaches the second pivot plate 193 to the linear actuator 200, while a second pivot pin 197 attaches the second pivot plate 193 to the horizontal frame member 105.

In other embodiments, the linear actuator may be provided in the system of linkages in place of any of the linkage members that operate in a linear manner, including the main linkage 181. Replacing one of the linkages with the linear actuator may reduce the number of linkages in the system. In one embodiment shown in FIG. 9A, a linear actuator 200 may be connected to the first connection member 187, which is connected to and controls the rotation of the main pivot shaft 180. The linear actuator 200 to operate or replace linkages may comprise, but is not limited to, a hydraulic, pneumatic, or mechanical system, or some combination thereof.

Skid Shoes

Figure 6C:
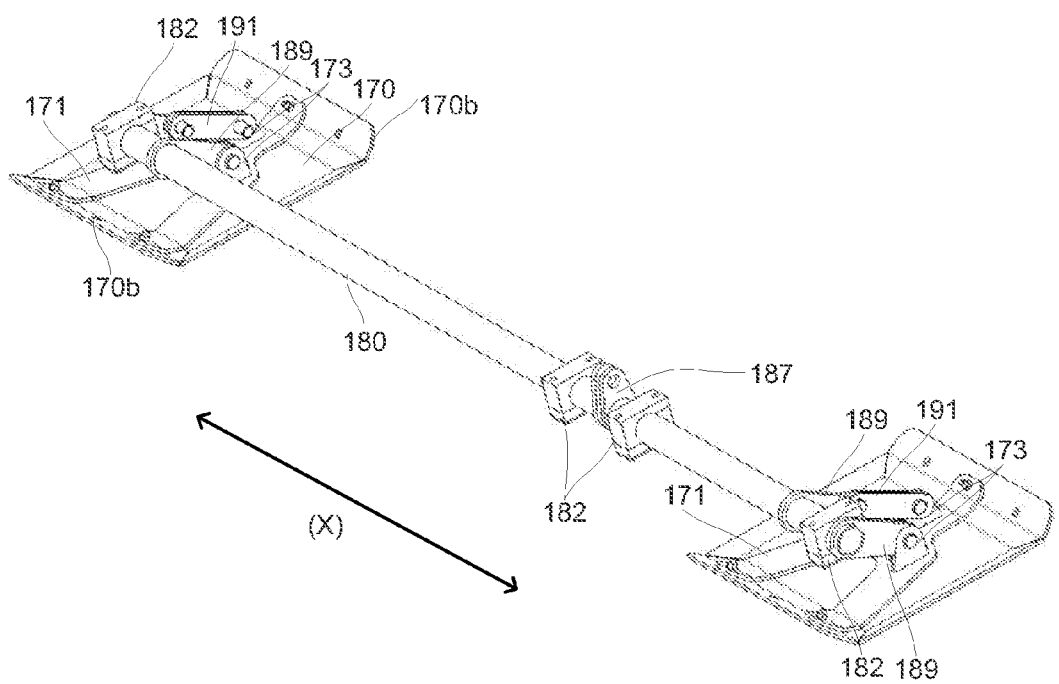
Figure 7A:
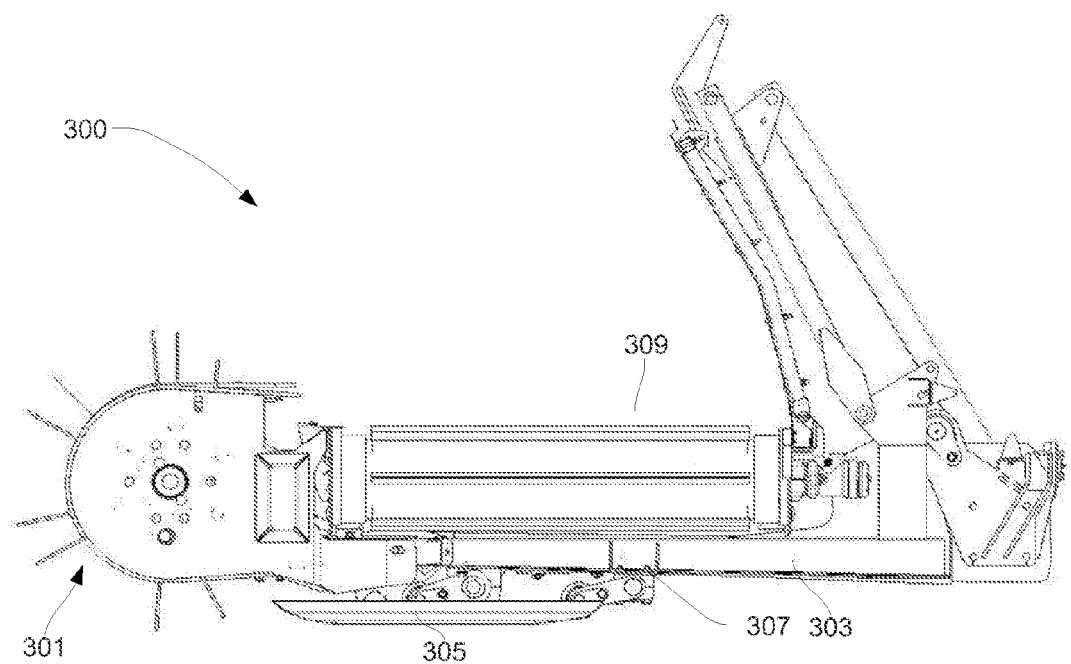
FIGS. 7A-7E illustrate multiple views of a merger related to the present disclosure.
Figure 7B:
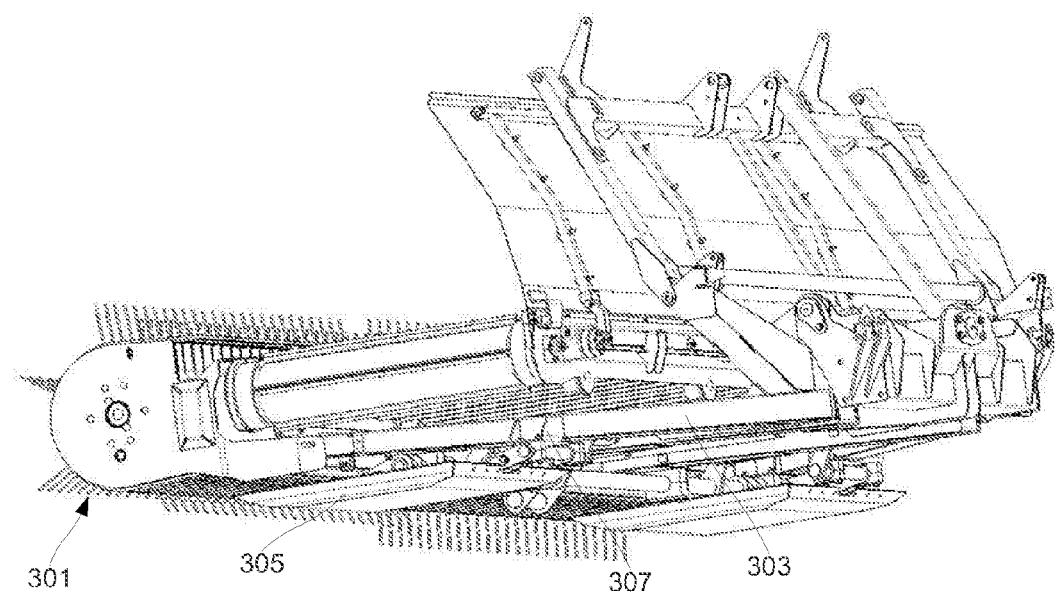
Figure 7C:
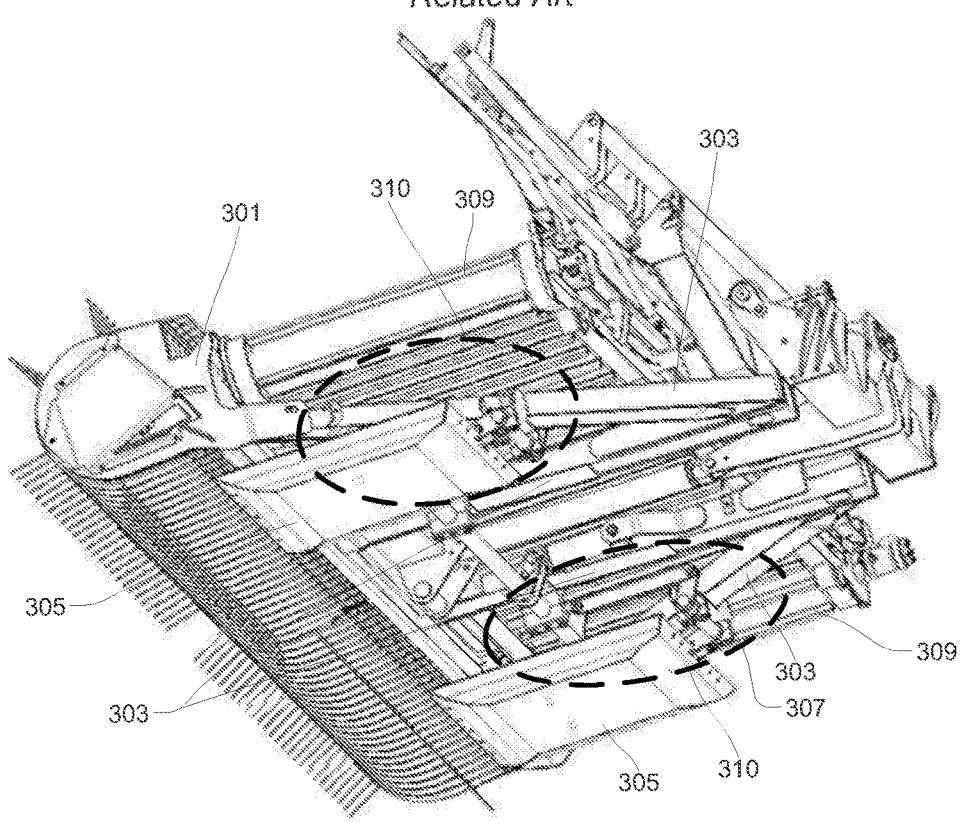
Figure 7D:
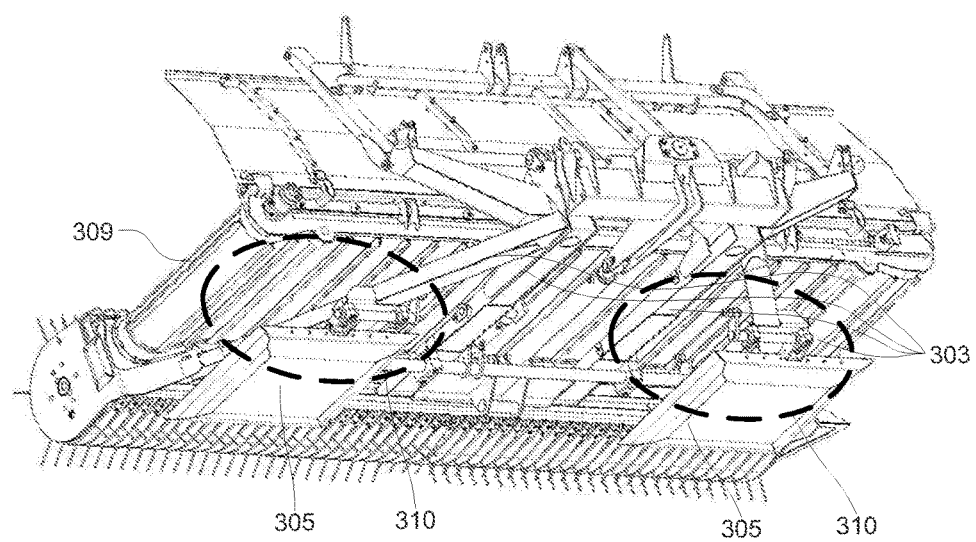
Figure 7E:
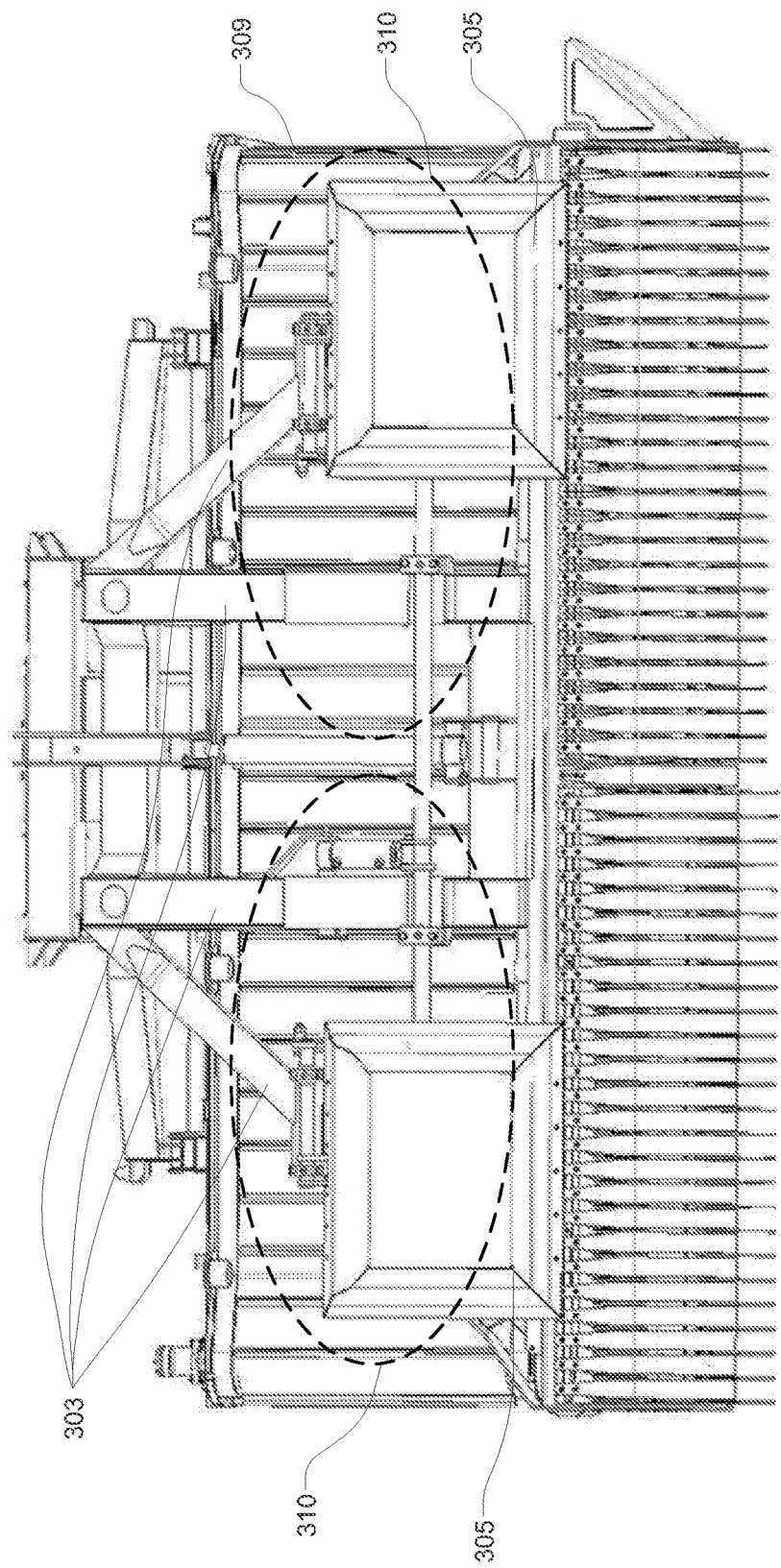

FIGS. 6A-6C describe skid shoes 170. The skid shoes 170 may be provided beneath the conveyor 130 (FIG. 1A) and the pick-up header 150 (FIG. 3), and may include a flat portion 170a, like a flat plate, and angled lip portions 170b on opposite sides of the flat portion 170a in the front to rear direction (Z axis). The flat portion 170a may include a flat lower surface which may contact the ground. Each skid shoe 170 may include at least one pivot member 173 for connecting the skid shoe 170 to the main pivot shaft 180. Further, a plurality of pivot members 173 may be provided on each skid shoe 170 in exemplary embodiments according to the present disclosure.

As illustrated in FIGS. 6B and 6C, each pivot member 173 may be provided on a reinforcement member 171 which provides increased stiffness and rigidity to the skid shoe 170. The reinforcement member 171 may attach to the angled lip portions 170b of the skid shoe 170. In other exemplary embodiments, the pivot members 173 may be mounted directly to the flat portion 170a of the skid shoe 170. During operation, each skid shoe 170 may contact the ground to maintain the minimum clearance (S) between the ground and the pick-up header 150 illustrated in FIG. 2A.

Exemplary Operation

An exemplary operation of the skid shoes 170 and system of linkages (180-200) according the present disclosure will now be described.

The linear actuator 200 may be provided to actuate at least one linkage in the system of linkages (180-200). The main linkage 181 may be driven by the linear actuator 200 so as to move in a linear direction, such as the front to rear direction (Z axis). Specifically, the movement of linear actuator 200 will cause the second pivot plate 193 to rotate so that the main linkage 181 may move in the front to rear direction (Z axis), as shown in FIG. 6A. As previously provided, the second pivot plate 193 is rotatably connected to the horizontal frame member 105 of the merger 100 (FIG. 2C).

The movement of the main linkage 181 in the front to rear direction (Z axis) as shown in FIGS. 5A and 5B, will be translated to the main pivot shaft 180 by the first pivot plate 183, the first linkage arm 185 and the first connection member 187. Specifically, the first pivot plate 183 will rotate relative to the pick-up header frame 157, causing the first linkage arm 185 to move in the front to rear direction (Z axis). An end of the first linkage arm 185 connected to the first connection member 187 is rotatable about the first connection pin 187a. As a result of this connection, the movement of the first linkage arm 185 in the front to rear direction (Z axis) causes the first connection member 187, and thereby the main pivot shaft 180, to rotate in a rotational direction (R) identified in FIG. 2A.

The first linkage arm 185 can move back and forth along the front to rear direction (Z axis). As such, the direction of rotation of the main pivot shaft 180 corresponds to the direction movement of the main linkage 181 and the first linkage arm 185 along the front to rear direction (Z axis), shown in FIG. 6A. When the main linkage 181 moves towards the pick-up teeth 151, the first linkage arm 185 moves towards the deflector 101, and the main pivot shaft 180 rotates in a first rotational direction (R1) as illustrated in FIG. 6A. When the main linkage 181 moves towards the deflector 101, the first linkage arm 185 moves towards the pick-up teeth 151, and the main pivot shaft 180 rotates in a second rotational direction (R2) as illustrated in FIG. 6A.

When the main pivot shaft 180 rotates due to the movement of the main linkage 181, the position of the skid shoe 170 is adjusted due to the connections between second connection members 189 and respective pivot members 173, and with second linkage arms 191 which are connected to respective pivot members 173 (FIG. 6B). The adjustment of the skid shoe 170 may include a change in its angle and/or a change in vertical displacement. According to one exemplary embodiment, rotation of the main pivot shaft 180 in the first rotational direction (R1) may vertically lower the skid shoe towards the ground, and rotation of the main pivot shaft 180 in a second rotational direction (R2) may vertically raise the skid shoe away from the ground (FIG. 6A). Further, rotation of the main pivot shaft 180 in one rotational direction may increase an angle between the skid shoe 170 and the ground, and rotation of the main pivot shaft 180 in another rotational direction may decrease the angle between the skid shoe 170 and the ground. In other embodiments, the angle and the vertical displacement of the skid shoe 170 may both be changed depending on the rotational direction of the main pivot shaft 180. The linkage member 191 may attach to a support plate 163 in a parallel linkage arrangement, maintaining a constant angle between the shoe and the bottom of the merger throughout the range of adjustment. The support plate 163 may be slotted which allows for the change in the angle of the shoe for improved ground following. In one embodiment, the end of at least one joint of the second linkage arm 191 has a slot 201 (FIGS. 8A-8B), allowing adjustment of the angle the skid shoe 170 makes with the horizontal.

As illustrated in FIGS. 1A-6C, and described herein, multiple skid shoes 170 may be connected to the main pivot shaft 180. The rotation of the main pivot shaft 180 due to the movement of the main linkage 181 may adjust the position of each of the multiple skid shoes 170. The skid shoes 170 may be provided near each shaft end 180a of the main pivot shaft 180 (FIG. 6B).

Multiple second connection members 189 may connect the main pivot shaft 180 to multiple pivot members 173 (FIG. 6C). As illustrated in FIGS. 6B and 6C, for each skid shoe 170, multiple second linkage arms 191 may be arranged in parallel with one second connection member 189 to form a four bar linkage, the second linkage arm 191 connected directly to the support plate 163 and one of the pivot members 173. The rotation of the main pivot 180 shaft may change the displacement of the skid shoe 170 relative to the bottom of the pick-up header 150 with the movement of the second linkage arm 191.

Figure 8A:
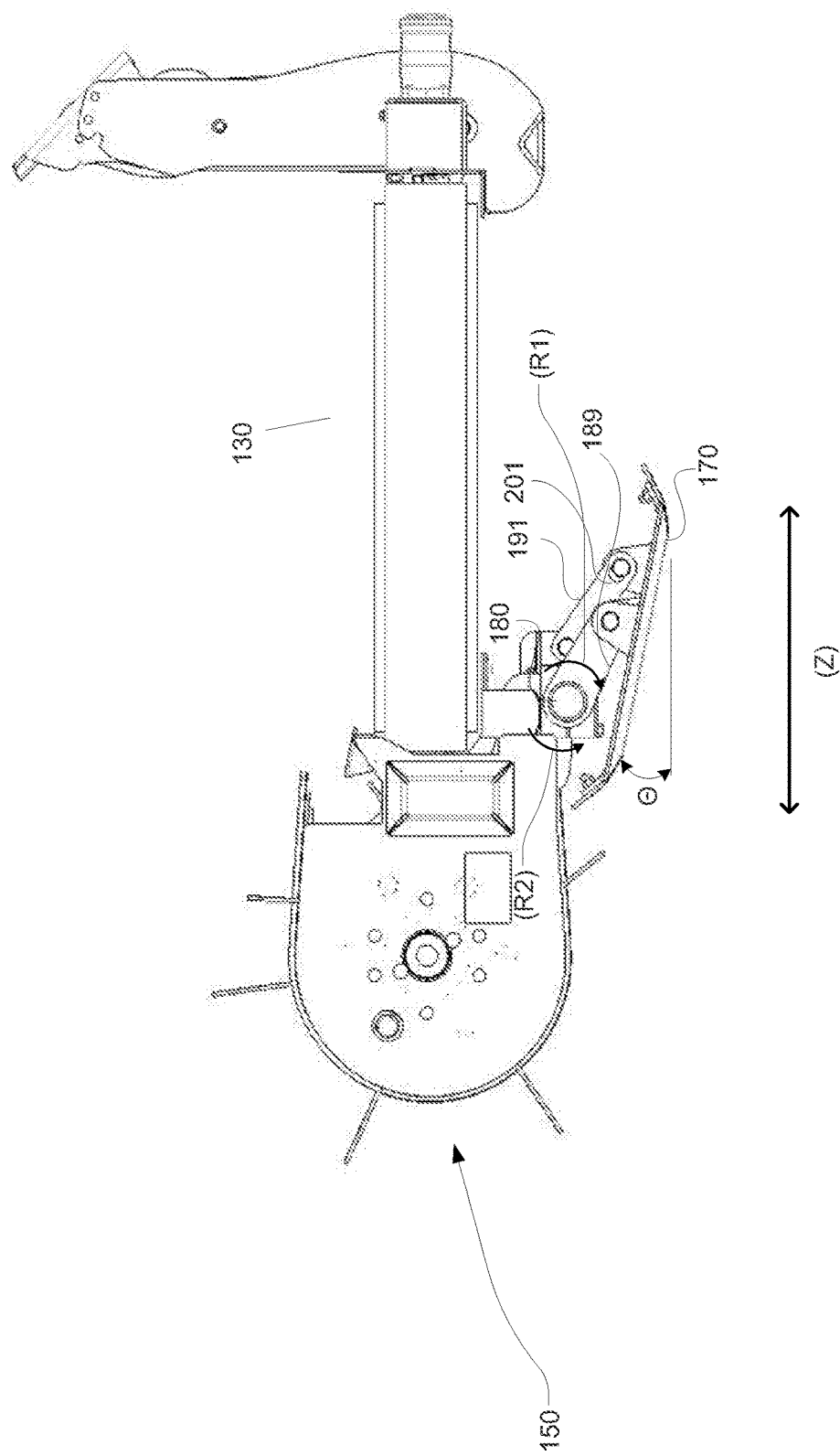
FIGS. 8A-8B illustrate a side view of a merger having a skid shoe positioned at different angles of articulation.
Figure 8B:
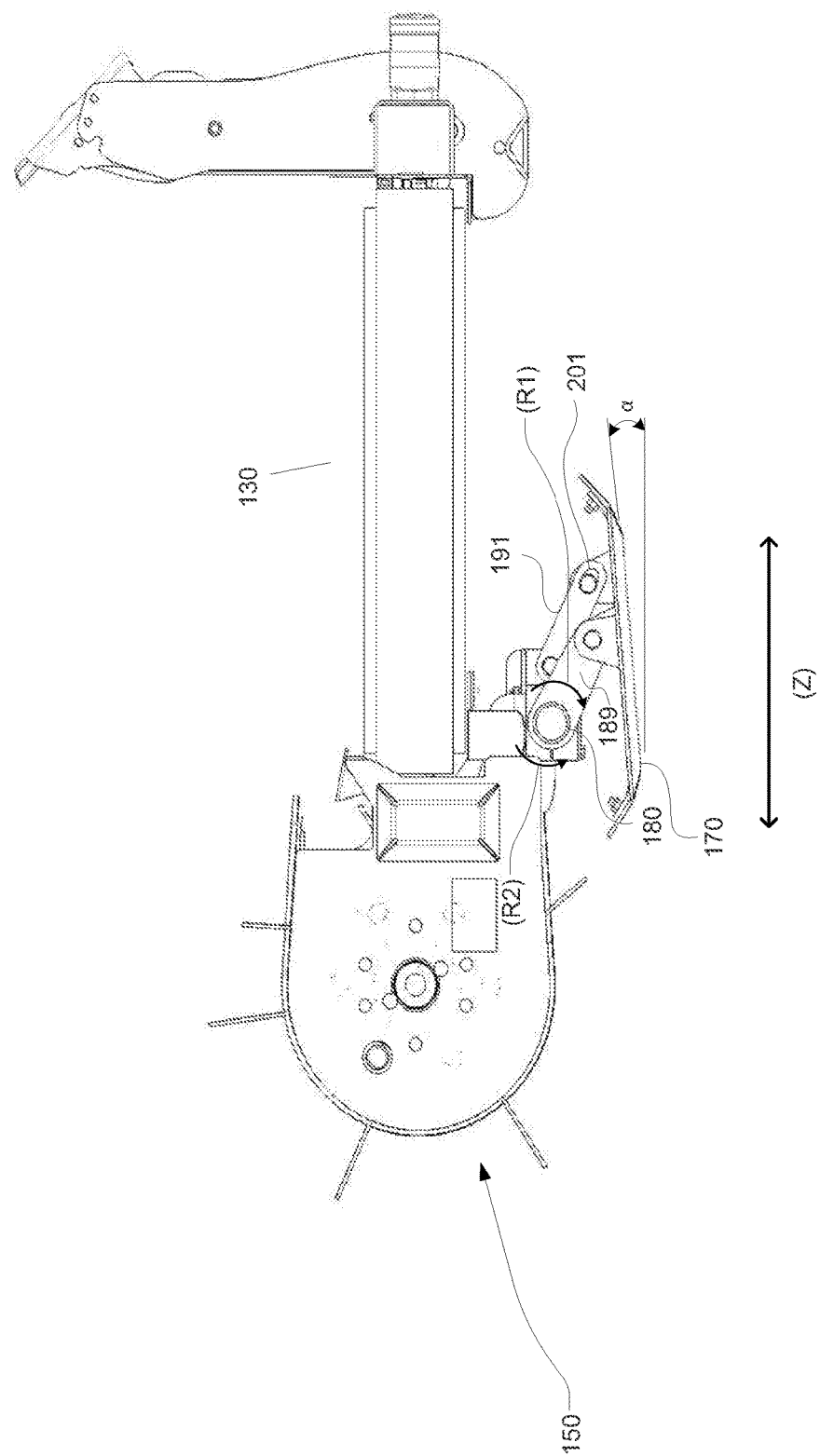
Figure 9A:
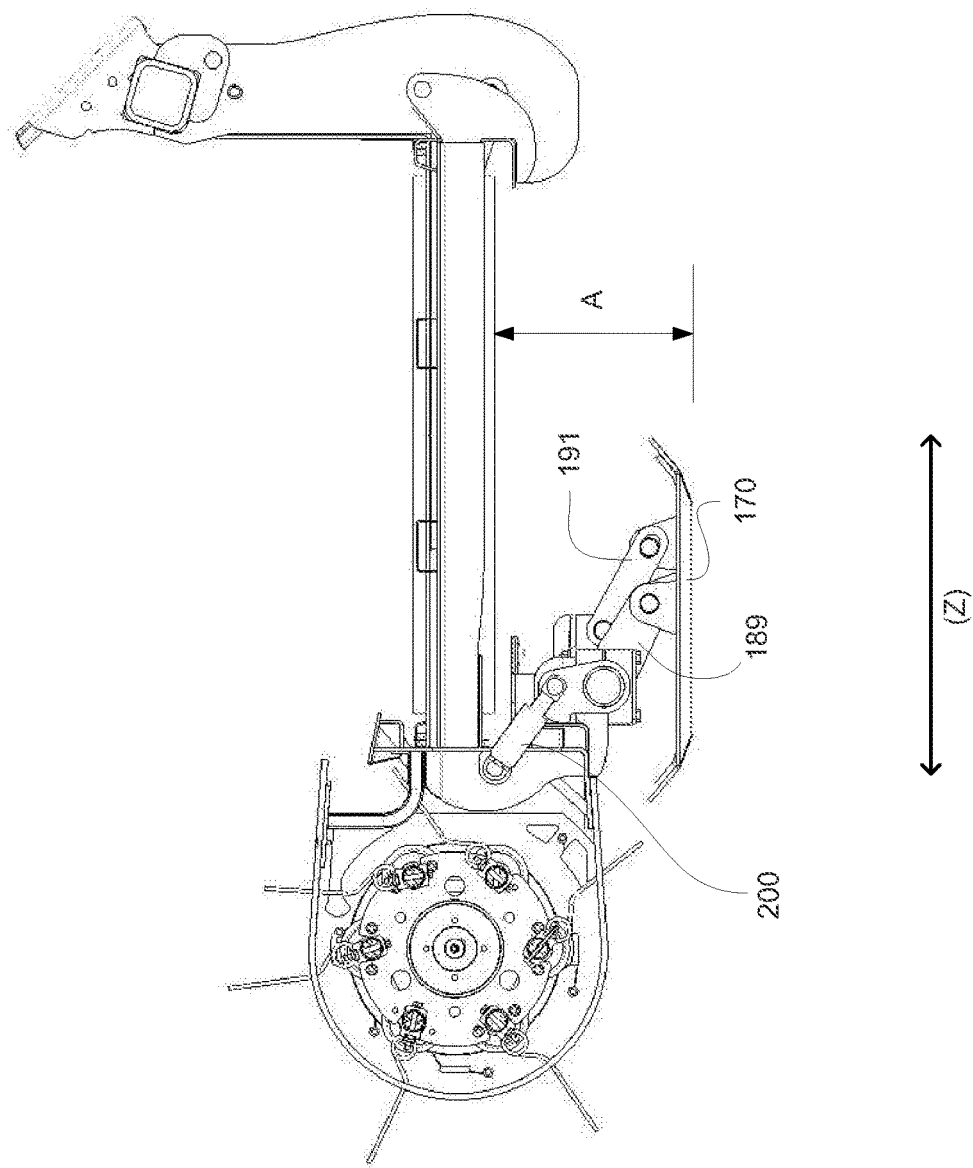
FIGS. 9A-9B illustrate side views of another embodiment of a merger related to the present disclosure.

FIGS. 8A-8B illustrate the pick-up header 150 and conveyor 130, connected to the skid shoe 170. The position and movement of the skid shoe 170 may be controlled by the system of linkages, detailed in FIGS. 6A-6C, or by a linear actuator 200, as shown in FIG. 9A, to pivot the second pivot plate 193 about the second pivot pin 197, which translates rocking motion into linear movement of the main linkage 181 along the Z axis, which in turn actuates the linear movement of the first linkage arm 185 by rocking the first pivot plate 183. As a result of the linear motion of the first linkage arm 185 acting on the first connection member 187, the main pivot shaft 180 rotates and moves the second connection member 189 and second linkage arm 191, which cause the skid shoe 170 to move vertically.

Figure 9B:
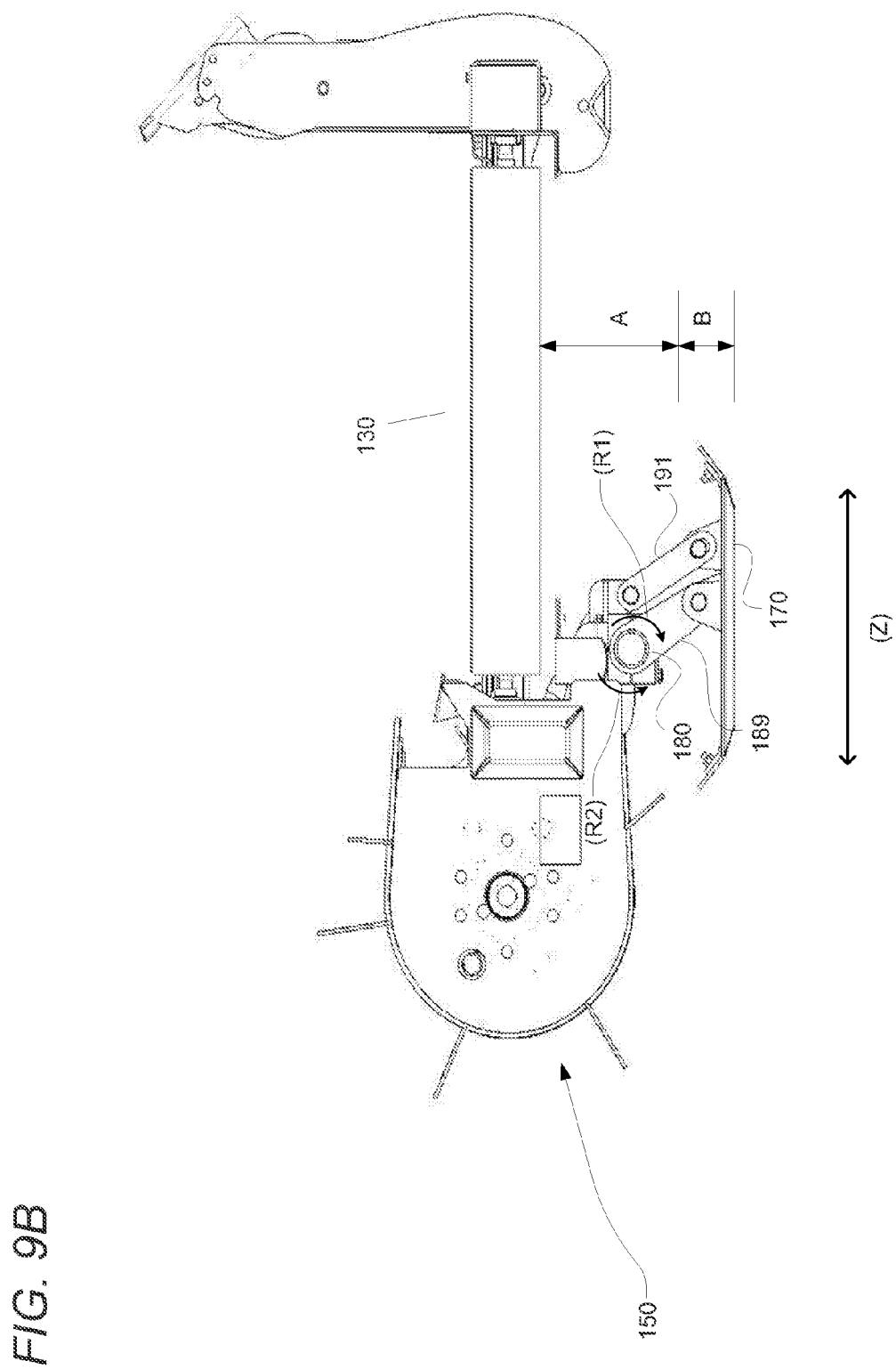

The embodiments of FIGS. 9A-B depict the result of rotating the main pivot shaft 180 to move the skid shoe 170 to different positions.

In one position, the skid shoe 170 is in a flat, lowered position of vertical displacement (A) due to rotation of the main pivot shaft 180 in the direction R2, as shown in FIG. 9A. In another position the skid shoe 170 is in a flat, extended position of vertical displacement (A+B) due to rotation of the main pivot shaft 180 in the direction R1, as shown in FIG. 9B.

The rotation of the skid shoe 170 about the angles $\Theta$ and $\alpha$ is due to contact between the skid shoe 170 and the ground surface as the skid shoe 170 passes over uneven terrain. The skid shoe 170 is free floating. The angular position of skid shoe 170 is independent of the adjustment of the pivot shaft 180 and movement of the main linkage 181. The center of gravity of the skid shoe 170 is located rearward of the leading pivot member 173, which causes the skid shoe 170 to maintain a standard rotation angle $\Theta$ of greater than zero, with the leading edge of the skid shoe 170 at an elevation above that of the trailing edge to help prevent the leading edge from digging into the ground when the pick-up header 150 is returned to the ground.

FIG. 8A shows the skid shoe rotating to an angle ($\Theta$), generally zero to 12 degrees from the horizontal as allowed by the slotted member 191 to permit the shoe to follow the contour of the ground. FIG. 9B shows the result of rotating the linkage in the R1 direction. The shoe lowers to raise the pick-up header 150 from the ground. FIG. 8B shows the ground following capabilities in the opposite direction to that shown in FIG. 8A with the skid shoe rotating to an angle ($\alpha$), generally zero to 5 degrees from the horizontal.

As illustrated in FIGS. 6A and 6B, the system of linkages (180-200) includes a first pivot pin 195 extending through the first pivot plate 183, and a second pivot pin 197 extending through the second pivot plate 193. The first pivot pin 195 is provided to mount the first pivot plate 183 on to the pick-up header frame 157 (FIG. 5A) such that the first pivot plate 183 can rotate about an axis perpendicular to the front and rear direction (Z axis) and parallel to the longitudinal direction (X axis). The second pivot pin 197 is provided to mount the second pivot plate 193 on to the pick-up header frame 105a (FIG. 5A) such that the second pivot plate 193 can rotate about another axis perpendicular to the front and rear direction (Z axis) and parallel to the longitudinal direction (X axis). The actuator for this application could be any type of linear applicator or a pivot could be replaced with a rotary actuator.

The embodiment shown (FIG. 2C) is a manual screw type linear actuator. The housing is rotated causing the internal screw to either extend or retract.

FIGS. 6A and 6B illustrate the system of linkages (180-200) without the pick-up header frame 157 or the horizontal frame member 105 of the merger 100. The main linkage 181 is attached to a second pivot plate 193 by a second main linkage pin 193a. A linkage actuator pin 193b attaches the second pivot plate 193 to the linear actuator 200, while a second pivot pin 197 attaches the second pivot plate 193 to the horizontal frame member 105.

Portions of the system of linkages (180-200) may be located within the conveyor 130 and surrounded by the conveyor belt 131. In one embodiment, the merger frame opening 105b may be provided in the horizontal frame member 105 of the merger 100, and the main linkage 181 may pass through the merger frame opening 105b to be substantially provided inside the conveyor 131. Further, in the exemplary embodiments of merger 100 and pick-up header 150 according to this disclosure, one end of the main linkage 181 passes through the merger frame opening 105b and the other end of the main linkage 181 passes through the pick-up header frame opening 157a (FIG. 5A).

With the main linkage 181 substantially provided inside the conveyor 130, the main pivot shaft 180 and the skid shoe 170 may be disposed below the conveyor 130 and behind the pick-up header 150. The main pivot shaft 180 may be disposed outside of the conveyor 130, and the support plates 163 may contact against the lower rear frame member 159 of the pick-up header 150 (FIG. 5A). With this configuration, the main linkage 181 may be free from obstructions below the conveyor belt 131 and may still allow for adjustment of the skid shoe 170. In some embodiments, equipped with linkages described, any or all of the components could be positioned outside the conveyor except for the 181.

In another embodiment, the skid shoe 170 may be fixed to a support on the pick-up header frame 157 or the lower rear frame member 159 of the pick-up header frame 157. The skid shoes 170 may be fixed such that the skid shoes 170 are not adjustable. In other exemplary embodiments, the skid shoes may be attached to the pick-up header 157 and adjustable at an attachment point. The skid shoe 170 in this configuration may be adjusted directly by a mechanical device or remotely by remote control. The attachment point may include a ball-and-socket joint, a servo, a ratchet joint, or a pin joint.

In other embodiments, the skid shoes 170 may be replaced with at least one roller. The roller may be fixed or ground following.

Although only certain embodiments of this invention have been described in detail above, those skilled in the art will readily appreciate that many modifications are possible in the exemplary embodiment without materially departing from the novel teachings and advantages of this disclosure. Accordingly, all such modifications are intended to be included within the scope of this disclosure. Further, it is to be understood that within the scope of the appended claims, the invention may be practiced otherwise than as specifically described herein.

The invention claimed is:
1. A merger apparatus comprising:
a horizontal frame extending in a longitudinal direction of the merger apparatus;
a conveyor with a conveyor belt;
a pick-up header including a plurality of pick-up teeth disposed between end plates, pick-up guards positioned to alternate with the pick-up teeth, and a header frame, the plurality of pick-up teeth and the pick-up guards being provided on a first side of the header frame, and the end plates being provided at ends of the header frame in the longitudinal direction; and
support members which support the pick-up header on the horizontal frame,
wherein all of the support members pass through an inside of the conveyor belt, and wherein the support members include first and second cross members extending in a front to rear direction of the merger apparatus, a first end of the first and second cross members being attached to a second side of the header frame opposite of the first side of the header frame, and a second end of the first and second cross members being attached to the horizontal frame.

2. The merger apparatus according to claim 1, wherein primary rollers of the conveyor which drive the conveyor belt are disposed between the horizontal frame and the pick-up header in a front to rear direction of the merger apparatus.

3. The merger apparatus according to claim 1, wherein the header frame includes a lower rear frame member and an upper rear frame member, and the conveyor is attached to the header frame at a vertical position between the lower rear frame member and the upper rear frame member.

4. The merger apparatus according to claim 1, further comprising:
    vertical frame members attached to the horizontal frame member; and
    a deflector mounted on the vertical frame members.

5. The merger apparatus according to claim 3, wherein a longitudinal guide is mounted onto the lower rear frame member, and support plates are positioned under the longitudinal guide.

6. The merger apparatus according to claim 5, wherein individual guide members are attached to the header frame below the first end of the first and second cross members, and the conveyor belt is fitted in a space defined between the longitudinal guide and the individual guide members.

* * * * *